United States Patent
Zolli

(10) Patent No.: US 10,497,006 B2
(45) Date of Patent: Dec. 3, 2019

(54) SYSTEMS AND METHODS FOR PROCESSING POTENTIALLY MISIDENTIFIED ILLEGITIMATE INCIDENTS

(71) Applicant: Facebook, Inc., Menlo Park, CA (US)

(72) Inventor: Michael Francis Zolli, Austin, TX (US)

(73) Assignee: Facebook, Inc., Menlo Park, CA (US)

( * ) Notice: Subject to any disclaimer, the term of this patent is extended or adjusted under 35 U.S.C. 154(b) by 1067 days.

(21) Appl. No.: 14/509,445

(22) Filed: Oct. 8, 2014

(65) Prior Publication Data

US 2016/0104170 A1 Apr. 14, 2016

(51) Int. Cl.
G06Q 30/00 (2012.01)
G06Q 30/02 (2012.01)
G06Q 50/00 (2012.01)

(52) U.S. Cl.
CPC ..... G06Q 30/0185 (2013.01); G06Q 30/0248 (2013.01); G06Q 50/01 (2013.01)

(58) Field of Classification Search
None
See application file for complete search history.

(56) References Cited

U.S. PATENT DOCUMENTS

| | | | | |
|---|---|---|---|---|
| 6,643,801 B1 * | 11/2003 | Jammu | ............. | G05B 19/4184 714/37 |
| 9,424,612 B1 * | 8/2016 | Bright | ................... | G06Q 50/01 |
| 9,537,814 B2 * | 1/2017 | Rubinstein | ............ | H04L 51/12 |
| 2005/0235044 A1 * | 10/2005 | Tazuma | ........... | G06F 17/30887 709/217 |
| 2006/0095955 A1 * | 5/2006 | Vong | ..................... | H04L 63/101 726/3 |
| 2006/0130147 A1 * | 6/2006 | Von-Maszewski | ......................... | H04L 63/1408 726/25 |
| 2007/0162331 A1 * | 7/2007 | Sullivan | ................ | G06Q 30/02 705/14.46 |
| 2008/0162449 A1 * | 7/2008 | Chao-Yu | ................ | G06F 21/51 |
| 2012/0047560 A1 * | 2/2012 | Underwood | ........... | G06Q 10/06 726/4 |
| 2012/0226701 A1 * | 9/2012 | Singh | ..................... | G06F 21/40 707/748 |
| 2013/0091042 A1 * | 4/2013 | Shah | ..................... | G06Q 40/02 705/35 |

(Continued)

OTHER PUBLICATIONS

Gianluca Stringhini, Christopher Kruegel, Giovanni Vigna, "Detecting Spammers on Social Networks", 2010, ACSAC '10 Dec. (Year : 2010).*

*Primary Examiner* — Paul R Fisher
(74) *Attorney, Agent, or Firm* — Sheppard Mullin Richter & Hampton LLP

(57) ABSTRACT

Systems, methods, and non-transitory computer-readable media can access a set of identified illegitimate incidents intended to be automatically disabled. One or more rules for determining misidentified illegitimate incidents can be acquired. It can be determined, based on the one or more rules, that at least a subset, out of the set of identified illegitimate incidents, has at least a threshold likelihood of being misidentified. Further processing can be performed with respect to at least the subset to prevent at least the subset from being automatically disabled.

20 Claims, 10 Drawing Sheets

(56) References Cited

U.S. PATENT DOCUMENTS

| | | | |
|---|---|---|---|
| 2013/0311301 A1* | 11/2013 | Grant | G06Q 30/0273 |
| | | | 705/14.69 |
| 2014/0279722 A1* | 9/2014 | Singh | G06N 5/022 |
| | | | 706/11 |
| 2015/0067777 A1* | 3/2015 | Heise | H04L 63/08 |
| | | | 726/3 |
| 2015/0150100 A1* | 5/2015 | Soni | H04L 63/0876 |
| | | | 726/7 |

* cited by examiner

SYSTEMS AND METHODS FOR PROCESSING POTENTIALLY MISIDENTIFIED ILLEGITIMATE INCIDENTS

FIELD OF THE INVENTION

The present technology relates to identifying illegitimate incidents. More particularly, the present technology relates to techniques for processing potentially misidentified illegitimate incidents.

BACKGROUND

Today, people often interact with networked environments or online services. Many users of computing devices (or systems) frequently browse web sites, access online media content, or otherwise use network services. Users with access to the Internet can perform online shopping, watch streaming movies, download software, utilize social networking services, and accomplish many other tasks. In one example, users of a social networking service or system can publish advertisements, purchase applications, give gifts, distribute promotions, or conduct various other transactions. Sometimes, an illegitimate user can attempt to publish illegitimate (e.g., fraudulent, fake, etc.) advertisements or conduct other illegitimate actions. In another example, users can provide their payment information (e.g., credit card information, bank account information) to an online service in order to fund various online activities. However, occasionally, an illegitimate user can attempt to illegitimately gain access to a legitimate user's payment information or otherwise compromise the legitimate user's account with the online service.

Accordingly, when a user of an online service, such as a social networking system, participates in various activities that involve the use of financial instruments compatible or operable with the online service, the financial instruments of the user can sometimes be stolen, illegitimately used, or otherwise compromised. These and other similar concerns can reduce the overall user experience associated with using online services.

SUMMARY

Various embodiments of the present disclosure can include systems, methods, and non-transitory computer readable media configured to access a set of identified illegitimate incidents intended to be automatically disabled. One or more rules for determining misidentified illegitimate incidents can be acquired. It can be determined, based on the one or more rules, that at least a subset, out of the set of identified illegitimate incidents, has at least a threshold likelihood of being misidentified. Further processing can be performed with respect to at least the subset to prevent at least the subset from being automatically disabled.

In an embodiment, the performing of the further processing with respect to at least the subset can further comprise placing at least the subset into a queue for manual review of legitimacy.

In an embodiment, the one or more rules can include a source rule. The source rule can specify that an identified illegitimate incident, in the set, has at least the threshold likelihood of being misidentified when the identified illegitimate incident is associated with a source absent from being previously determined to be illegitimate.

In an embodiment, the one or more rules can include a domain rule. The domain rule can specify that an identified illegitimate incident, in the set, has less than at least the threshold likelihood of being misidentified when the identified illegitimate incident is associated with a prominent domain that is publicly available.

In an embodiment, the one or more rules can include a social connection rule. The social connection rule can specify that an identified illegitimate incident, in the set, has at least the threshold likelihood of being misidentified when at least one of 1) the identified illegitimate incident is associated with a ratio of social connection request acceptances to social connection requests that at least meets a social connection request ratio threshold or 2) the identified illegitimate incident is associated with a quantity of social connections that at least meets a social connection quantity threshold.

In an embodiment, the one or more rules can include a messaging rule. The messaging rule can specify that an identified illegitimate incident, in the set, has at least the threshold likelihood of being misidentified when the identified illegitimate incident is associated with an amount of communicating messages that at least meets a messaging amount threshold.

In an embodiment, the one or more rules can include a bid type rule. The bid type rule can specify that an identified illegitimate incident, in the set, has at least the threshold likelihood of being misidentified when the identified illegitimate incident is associated with a Cost Per Mille (CPM) bid type.

In an embodiment, the one or more rules can include a bid type rule. The bid type rule can specify that an identified illegitimate incident, in the set, has less than at least the threshold likelihood of being misidentified when the identified illegitimate incident is associated with a Cost Per Click (CPC) bid type.

In an embodiment, the one or more rules can include a landing page rule. The landing page rule can specify that an identified illegitimate incident, in the set, has less than at least the threshold likelihood of being misidentified when the identified illegitimate incident is associated with an illegitimate landing page.

In an embodiment, the one or more rules can be generated based on analyzing a verified set of misidentified illegitimate incidents to determine one or more common characteristics associated with the verified set of misidentified illegitimate incidents.

In an embodiment, the one or more rules can be static. In some instances, the one or more rules can be utilized by a conditional response framework. In some cases, the conditional response framework can be implemented with a risk system.

In an embodiment, the set of identified illegitimate incidents can include at least one of an activity identified as having an threshold likelihood of being an illegitimate activity or an account identified as having a threshold likelihood of being an illegitimate account.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
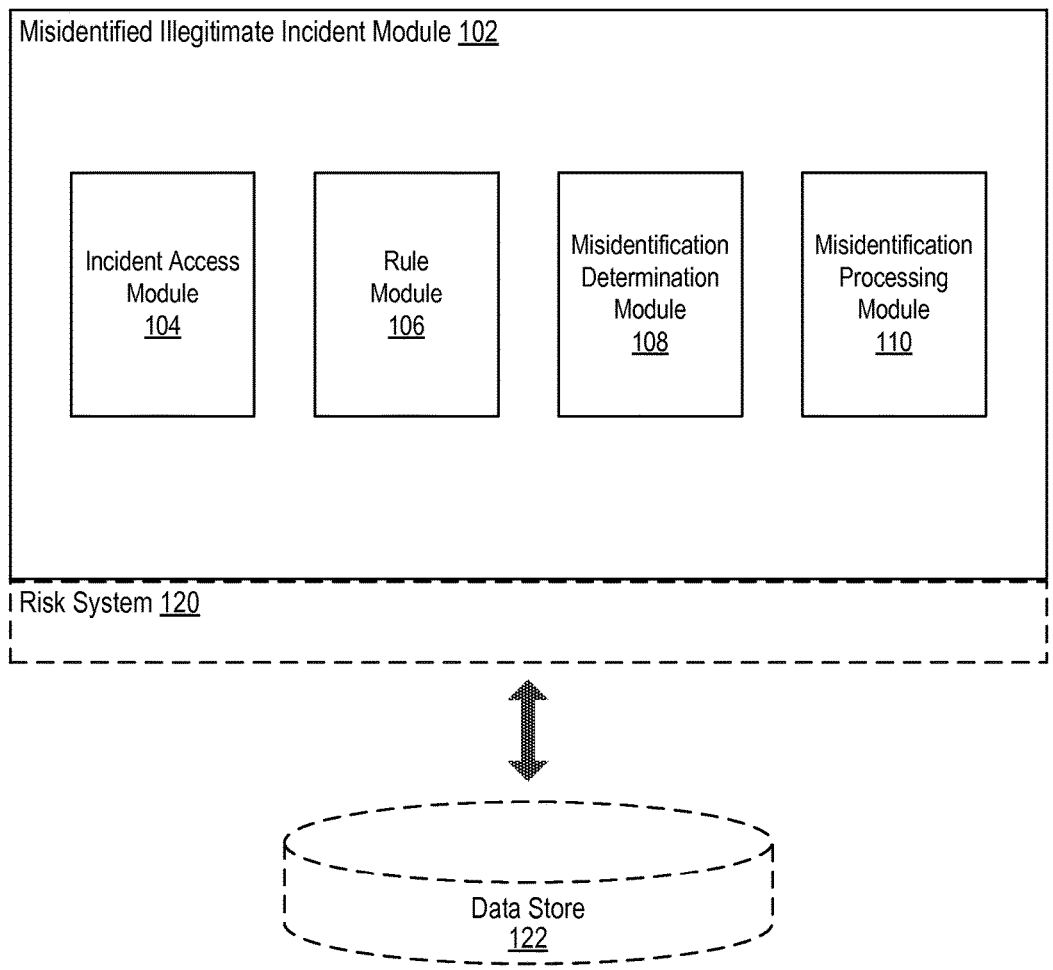
FIG. 1 illustrates an example system including an example misidentified illegitimate incident module configured to facilitate processing potentially misidentified illegitimate incidents, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Processing Potentially Misidentified Illegitimate Cases

People often conduct transactions or engage in activities that involve the use of financial instruments, such as credit cards, bank accounts, electronic or digital payment services, etc. When users of computing devices utilize financial instruments in a networked environment (e.g., Internet, cellular data network, online service, social networking system, etc.), the users must often provide information about their financial instruments. In some cases, illegitimate or fraudulent users can attempt to steal information about the financial instruments of legitimate online service users. In some cases, an illegitimate user can attempt to link a stolen financial instrument with a legitimate user's online service account.

Furthermore, in some instances, illegitimate users can attempt to create accounts with social networking systems or services and utilize those accounts to conduct illegitimate activities within the social networking systems. For example, an illegitimate user can create a plurality of accounts with a social networking system in hopes that at least some accounts will be able to successfully publish one or more illegitimate advertisements.

Conventional approaches can attempt to detect, identify, reduce, and prevent illegitimate incidents, such as illegitimate accounts (e.g., users) and/or illegitimate activities (e.g., transactions). Conventional approaches to detecting, identifying, reducing, or preventing illegitimate incidents typically include manually reviewing the incidents, such as by scrutinizing characteristics or traits associated with the incidents, to determine patterns or trends that are frequently found to be linked to illegitimate users and/or illegitimate activities. Upon determining the patterns or trends, rules for identifying illegitimate incidents can be manually created. However, conventional approaches are generally time-consuming and require significant manual resources.

Moreover, conventional approaches to detecting or identifying illegitimate incidents can sometimes be insufficiently accurate. In some cases, illegitimate incidents that have been identified as such can be misidentified. Misidentified illegitimate incidents can include legitimate incidents that have been inaccurately or incorrectly identified as being allegedly illegitimate. Misidentified illegitimate incidents can be referred to as false positives. Under conventional approaches, misidentified illegitimate incidents (i.e., false positives) can be treated or processed the same as or similar to correctly identified illegitimate incidents (i.e., true positives). As such, misidentified illegitimate incidents can be disabled, blocked, or otherwise stopped under conventional approaches. However, when misidentified illegitimate incidents are disabled, legitimate users or accounts associated with the misidentified illegitimate incidents can suffer reduced user experiences, such as when having to undergo an appeal process. Also, revenue can be lost for the users or accounts associated with the misidentified illegitimate incidents. Further, when misidentified illegitimate incidents are disabled, it can take significant amounts of time to correct the misidentifications. Accordingly, these and other concerns can create challenges for utilizing online services.

Therefore, an improved approach to processing misidentified, or potentially misidentified, illegitimate incidents can be beneficial for addressing or alleviating various concerns associated with conventional approaches. Various embodiments of the present disclosure can access a set of identified illegitimate incidents intended to be automatically disabled. One or more rules (or policies) for determining misidentified illegitimate incidents can be acquired. It can be determined, based on the one or more rules, that at least a subset, out of the set of identified illegitimate incidents, has at least a threshold likelihood of being misidentified. Further processing can be performed with respect to at least the subset to prevent at least the subset from being automatically disabled. It is contemplated that there can be many variations and/or other possibilities.

FIG. 1 illustrates an example system 100 including an example misidentified illegitimate incident module 102 configured to facilitate processing potentially misidentified illegitimate incidents, according to an embodiment of the present disclosure. In some embodiments, the misidentified illegitimate incident module 102 can correspond to a conditional response framework. As shown in the example of FIG. 1, the misidentified illegitimate incident module 102 can include an incident access module 104, a rule module 106, a misidentification determination module 108, and a misidentification processing module 110. In some instances, the example system 100 can also include a risk system 120 and at least one data store 122. The components (e.g., modules, elements, etc.) shown in this figure and all figures herein are exemplary only, and other implementations may include additional, fewer, integrated, or different components. Some components may not be shown so as not to obscure relevant details.

In some embodiments, the misidentified illegitimate incident module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the example misidentified illegitimate incident module 102 can be implemented, in part or in whole, as software running on one or more computing devices or systems, such as on a user or client computing device. For example, the misidentified illegitimate incident module 102 can be implemented as or within an application (e.g., app), a program, or an applet, etc., running on a user computing device or client computing system. In another example, the misidentified illegitimate incident module 102 can be implemented using one or more computing devices or systems that include one or more servers, such as network servers or cloud servers. In some instances, the misidentified illegitimate incident module 102 can, in part or in whole, be implemented within or configured to operate with a social networking system (or service), such as the social networking system 930 of FIG. 9. It should be understood that many variations are possible.

In the example of FIG. 1, the incident access module 104 can be configured to facilitate accessing a set of identified illegitimate incidents intended to be automatically disabled. For example, the incident access module 104 can receive, get, or obtain the set of identified illegitimate incidents. Each incident, such as an account or an activity, within the set can already be identified as (allegedly) being illegitimate. For example, the set of identified illegitimate incidents can include at least one of an activity identified as having a threshold likelihood of being an illegitimate activity or an account identified as having a threshold likelihood of being an illegitimate account. In some embodiments, the set can be received, acquired, or otherwise accessed via the risk system 120. In some instances, the set can also be identified by the risk system 120 as being illegitimate. More details regarding the incident access module 104 will be provided below with reference to FIG. 2.

The rule module 106 can be configured to facilitate acquiring one or more rules for determining misidentified illegitimate incidents. In some implementations, the one or more rules can be developed based on research and analysis with respect to data associated with incidents known or verified to be misidentified as being illegitimate. For example, the one or more rules can be generated based on analyzing a verified set of misidentified illegitimate incidents to determine one or more common characteristics associated with the verified set of misidentified illegitimate incidents. In some embodiments, the one or more rules can be developed at the risk system 120 and can, in some cases, be received or otherwise acquired from the risk system 120. In some embodiments, the one or more rules can be developed, generated, or otherwise acquired by the misidentified illegitimate incident module 102. The rule module 106 will be described in more detail below with reference to FIG. 3.

Furthermore, as shown in FIG. 1, the example system 100 can include the risk system 120. The risk system 120 can be configured to facilitate various tasks and operations associated with managing risk. For example, the risk system 120 can be utilized by an online service. The risk system 120 can generate and/or implement one or more rules (or policies) to identify activities or accounts that are likely to be illegitimate. The misidentified illegitimate incident module 102 can also be configured to communicate or operate with the risk system 120. In some embodiments, the misidentified illegitimate incident module 102 can be implemented or can reside within the risk system 120. In some instances, the misidentified illegitimate incident module 102 can be implemented separately from the risk system 120, such as in the form of a layer or framework in addition to the risk system 120. It should be appreciated that many variations are possible.

Moreover, the at least one data store 122 can be configured to communicate or operate with the misidentified illegitimate incident module 102 and/or with the risk system 120. The at least one data store 122 can be configured to store and maintain various types of data. In some implementations, the at least one data store 122 can store information associated with the social networking system (e.g., the social networking system 930 of FIG. 9). The information associated with the social networking system can include data about users, social connections, social interactions, maps, locations, geo-fenced areas, places, events, groups, posts, communications, content, account settings, privacy settings, a social graph, and various other types of data. In some implementations, the at least one data store 122 can store information associated with users, such as user identifiers, user information, user specified settings, content produced by users, and various other types of user data. In some embodiments, the at least one data store 122 can store information associated with the risk system 120, such as data associated with various online service accounts and activities. In some embodiments, the at least one data store 122 can be implemented with or within the risk system 120.

The misidentification determination module 108 can be configured to facilitate determining, based on the one or more rules, that at least a subset, out of the set of identified illegitimate incidents, has at least a threshold likelihood of being misidentified. For example, the misidentification determination module 108 can utilize the rules to identify at least some incidents that are likely misidentified as being illegitimate, when those incidents are actually legitimate. The misidentification determination module 108 will be described in more detail below with reference to FIG. 4.

Furthermore, the misidentification processing module 110 can be configured to facilitate performing further processing with respect to at least the subset to prevent at least the subset from being automatically disabled. For example, the misidentification processing module 110 can cause at least the subset to undergo additional processing while the rest of the set is automatically disabled, blocked, and/or stopped. More details regarding the misidentification processing module 110 will be discussed below with reference to FIG. 5.

Figure 2:
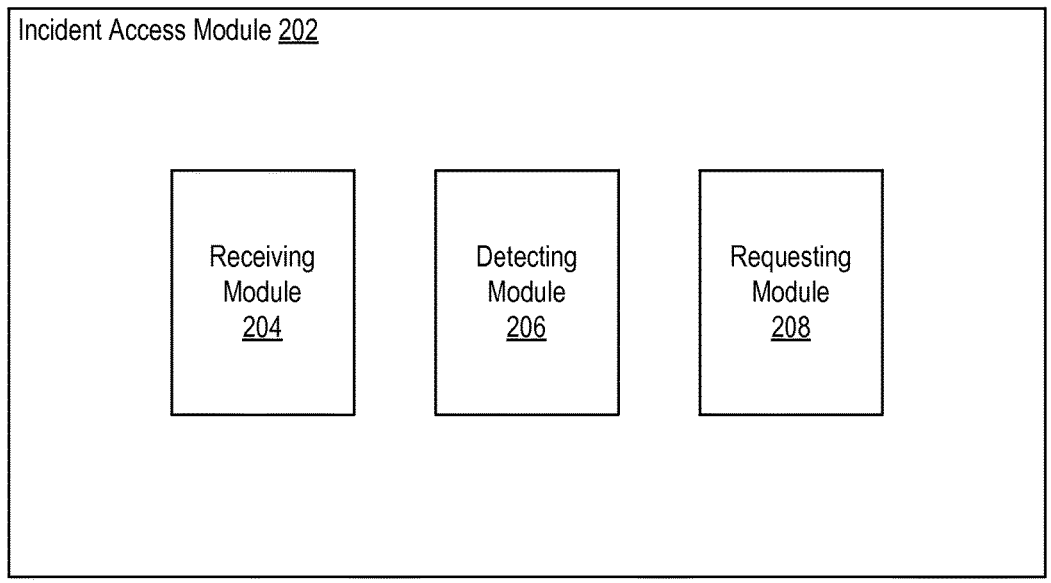
FIG. 2 illustrates an example incident access module configured to facilitate processing potentially misidentified illegitimate incidents, according to an embodiment of the present disclosure.

FIG. 2 illustrates an example incident access module 202 configured to facilitate processing potentially misidentified illegitimate incidents, according to an embodiment of the present disclosure. In some embodiments, the incident access module 104 of FIG. 1 can be implemented as the example incident access module 202. As shown in FIG. 2, the example incident access module 202 can include a receiving module 204. In some embodiments, the example incident access module 202 can also include a detecting module 206 and a requesting module 208.

As discussed, the incident access module 202 can be configured to facilitate accessing a set of identified illegitimate incidents intended to be automatically disabled. For example, the incident access module 202 can get, fetch, obtain, receive, acquire, or otherwise access the set of identified illegitimate incidents. Again, the identified illegitimate incidents can be identified by the risk system 120 of FIG. 1 as being (allegedly) illegitimate. In some implementations, the risk system 120 can provide access to the set of identified illegitimate incidents and the receiving module 204 can be configured to receive access to the set. Having received access to the set, the misidentified illegitimate incident module 102 of FIG. 1 can utilize the set for performing various operations.

In some embodiments, the detecting module 206 can detect that one or more incidents have been identified, such as by the risk system 120, as being illegitimate. The one or more incidents can form the set of identified illegitimate incidents. Subsequent to detecting that the set of one or more incidents has been identified as being illegitimate, the requesting module 208 can request for access to the set. For example, the requesting module 208 can request the risk system 120 for access to the set. With access to the set of identified illegitimate incidents, each respective incident in the set can be analyzed in order to determine whether or not the respective incident had been misidentified.

Figure 3:
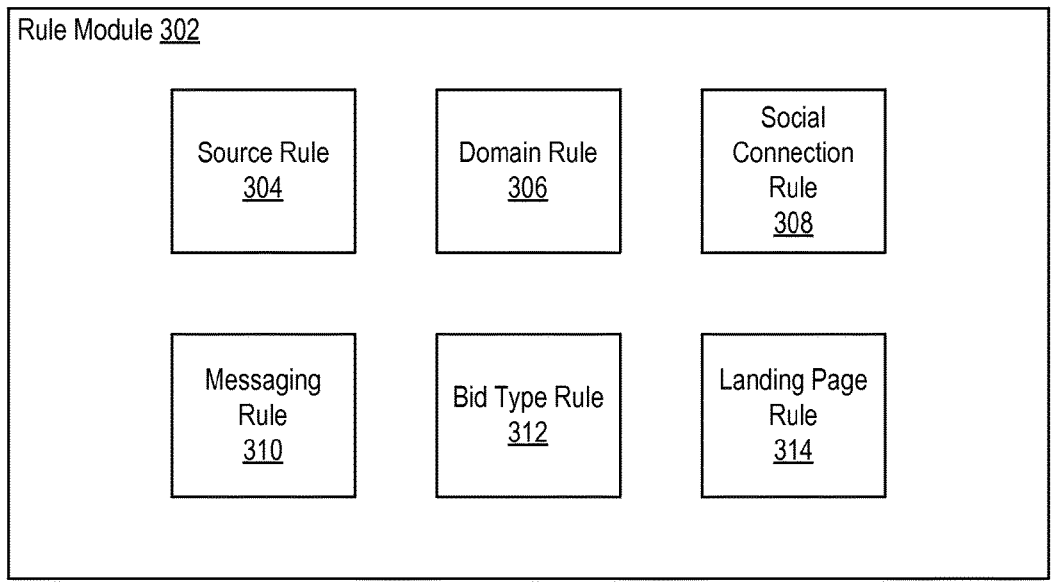
FIG. 3 illustrates an example rule module configured to facilitate processing potentially misidentified illegitimate incidents, according to an embodiment of the present disclosure.

FIG. 3 illustrates an example rule module 302 configured to facilitate processing potentially misidentified illegitimate incidents, according to an embodiment of the present disclosure. In some embodiments, the rule module 106 of FIG. 1 can be implemented as the example rule module 302. As discussed previously, the rule module 302 can be configured to acquire one or more rules for determining misidentified illegitimate incidents. In some implementations, the rule module 302 can develop, generate, receive, access, or otherwise acquire one or more rules including (but not limited to) at least one of a source rule 304, a domain rule 306, a social connection rule 308, a messaging rule 310, a bid type rule 312, or a landing page rule 314. The one or more rules can specify or indicate whether each respective identified illegitimate incident, in an accessed set of identified illegitimate incidents, should be considered misidentified or not. It should be appreciated that there can be many variations or other possibilities.

In some instances, the source rule 304 can specify that a particular identified illegitimate incident, in the accessed set of identified illegitimate incidents, has at least a threshold likelihood of being misidentified when the particular identified illegitimate incident is associated with a source absent from being previously determined to be illegitimate. The source rule 304 can specify that the particular identified illegitimate incident, in the set, should be considered misidentified when the incident is associated with a source not previously determined (or known, recognized, etc.) to be illegitimate. In one example, the source rule 304 can specify that the identified illegitimate incident is misidentified, or considered to be misidentified, when the incident is associated with an Internet Protocol (IP) address that has not been recognized as being illegitimate, fraudulent, blacklisted, etc.

In some cases, the domain rule 306 can specify that a particular identified illegitimate incident, in the set, has less than at least the threshold likelihood of being misidentified when the particular identified illegitimate incident is associated with a prominent domain that is publicly available. The domain rule 306 can suggest that the particular incident is more likely to be misidentified when the incident is associated with a less prominent domain that is generally unavailable to the public. In some cases, smaller legitimate businesses utilize customized, lesser known email domains. Incidents that are associated with these email domains, but that are identified as being illegitimate, are more likely to have been misidentified. In one example, the domain rule 306 specifies that the identified illegitimate incident has less than at least the threshold likelihood of being misidentified when the incident is associated with a public, well-known, or commonly used email domain.

In some instances, the social connection rule 308 can specify that an identified illegitimate incident, in the set, has at least the threshold likelihood of being misidentified when the identified illegitimate incident is associated with a ratio of social connection request acceptances to social connection requests that at least meets a social connection request ratio threshold. The social connection rule 308 can suggest that illegitimate incidents are generally unlikely to be associated with social networking system accounts that have a substantially high friend request acceptance ratio (i.e., friend success ratio). For example, the social connection rule 308 can specify that the incident should be considered misidentified when the incident is associated with a social networking system account that has a friend success ratio of at least 0.756 (or 75.6%) or other suitable value.

Additionally or alternatively, the social connection rule 308 can also specify that the incident has at least the threshold likelihood of being misidentified when the incident is associated with a quantity of social connections that at least meets a social connection quantity threshold. For example, the social connection rule 308 can specify that the incident should be considered misidentified when the incident is associated with a social networking system account that has at least 800 or other suitable value of friends or social connections.

In some cases, the messaging rule 310 can specify that an identified illegitimate incident, in the set, has at least the threshold likelihood of being misidentified when the identified illegitimate incident is associated with an amount of communicating messages that at least meets a messaging amount threshold. For example, under the messaging rule 310, if the incident is associated with a social networking system account that has received at least 500 or other suitable value of messages and/or sent at least 500 or other suitable value of messages, then the incident should be considered misidentified.

In some instances, the bid type rule 312 can specify that an identified illegitimate incident, in the set, has at least the threshold likelihood of being misidentified when the identified illegitimate incident is associated with a Cost Per Mille (CPM) bid type. In some instances, the bid type rule 312 can specify that the incident has less than at least the threshold likelihood of being misidentified when the incident is associated with a Cost Per Click (CPC) bid type. The bid type rule 312 can, for example, be based on the reasoning that if an incident is associated with a light weight interface and/or a CPM bid type, the incident is more likely to be legitimate (and thus misidentified), whereas if the incident is associated with a sophisticated interface and/or a CPC bid type, then the incident is more likely to be illegitimate (and thus correctly identified).

Moreover, in some cases, the landing page rule 314 can specify that an identified illegitimate incident, in the set, has less than at least the threshold likelihood of being misidentified when the identified illegitimate incident is associated with an illegitimate landing page. For example, in accordance with the landing page rule 314, if the incident is associated with a legitimate landing page or destination (e.g., legitimate webpage, legitimate application, legitimate online resource, etc.), then the incident is more likely to be legitimate, whereas if the incident is associated with an illegitimate landing page, then the incident is more likely to be illegitimate.

As discussed, it should be appreciated that there can be many other uses, applications, and/or variations. For example, in some embodiments, each of the one or more rules can be static. Updates to the rules must be made manually. In another example, each of the one or more rules can, in some cases, be automatically updated or refined over time.

Figure 4:
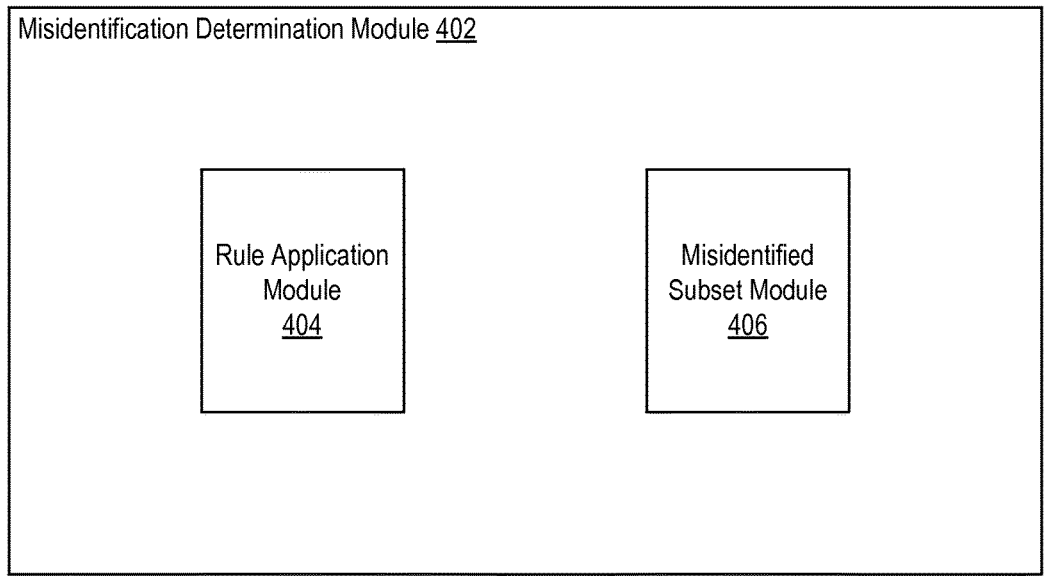
FIG. 4 illustrates an example misidentification determination module configured to facilitate processing potentially misidentified illegitimate incidents, according to an embodiment of the present disclosure.

FIG. 4 illustrates an example misidentification determination module 402 configured to facilitate processing potentially misidentified illegitimate incidents, according to an embodiment of the present disclosure. In some embodiments, the misidentification determination module 108 of FIG. 1 can be implemented as the example misidentification determination module 402. As shown in the example of FIG. 4, the misidentification determination module 402 can include a rule application module 404 and a misidentified subset module 406.

As discussed previously, the misidentification determination module 402 can be configured to facilitate determining, based on one or more rules, that at least a subset of identified illegitimate incidents, out of an accessed set of identified illegitimate incidents, has at least a threshold likelihood of being misidentified. In some embodiments, the misidentification determination module 402 can utilize the rule application module 404 to apply one or more acquired rules to the accessed set of identified illegitimate incidents to determine whether any incidents are misidentified or should be considered misidentified. If the rules detect, hit, match, or mark, etc., one or more identified illegitimate incidents in the set, then the one or more identified illegitimate incidents are considered as having at least the threshold likelihood of being misidentified. The one or more identified illegitimate incidents thus form the subset (i.e., a subset of misidentified illegitimate incidents, a misidentified subset, etc.). In some implementations, the misidentified subset module 406 can record, store, or otherwise keep track of the subset of misidentified illegitimate incidents.

In some embodiments, all of the one or more rules can be applied to each respective incident in the set of identified illegitimate incidents. As long as at least one rule hits, matches, or detects the respective incident, then the respective incident is determined, labeled, or categorized as being misidentified.

Figure 5:
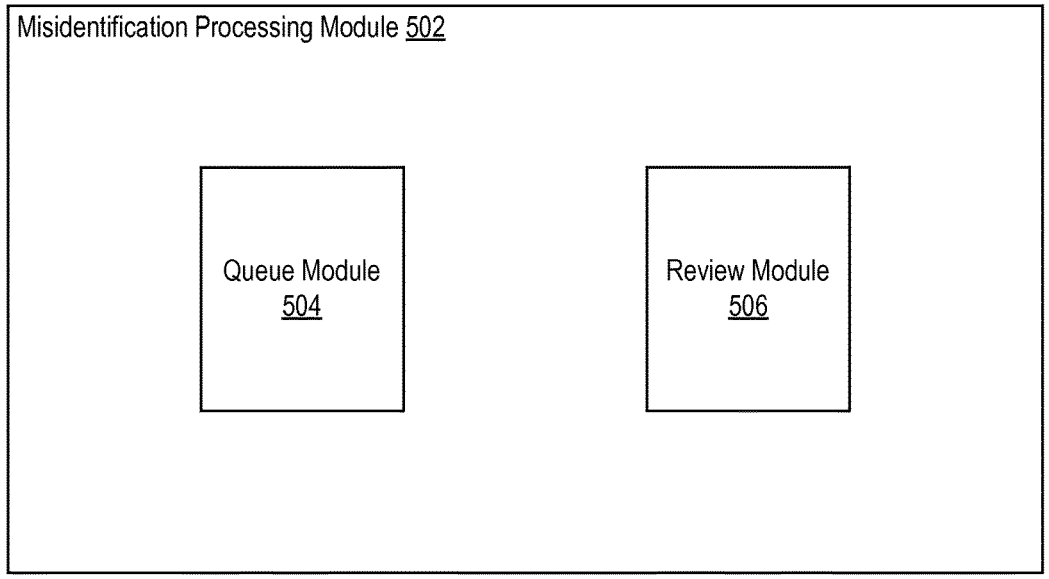
FIG. 5 illustrates an example misidentification processing module configured to facilitate processing potentially misidentified illegitimate incidents, according to an embodiment of the present disclosure.

FIG. 5 illustrates an example misidentification processing module 502 configured to facilitate processing potentially misidentified illegitimate incidents, according to an embodiment of the present disclosure. In some embodiments, the misidentification processing module 110 of FIG. 1 can be implemented as the example misidentification processing module 502. As shown in the example of FIG. 5, the misidentification processing module 502 can include a queue module 504 and a review module 506.

As discussed above, at least a subset of misidentified illegitimate incidents can be determined out of a set of identified illegitimate incidents. In some implementations, the misidentification processing module 502 can facilitate placing at least the subset of misidentified illegitimate incidents into a queue for manual review of legitimacy. The subset of misidentified illegitimate incidents can be placed into the queue for manual review, as opposed to the remaining identified illegitimate incidents in the set which become disabled, blocked, stopped, etc. In some embodiments, the misidentification processing module 502 utilizes the queue module 504 to place each incident in the subset into the queue. The queue module 504 can also be configured to store, maintain, and/or keep track of the queue.

Moreover, in some embodiments, the review module 506 can be configured to submit incidents in the queue for manual review of legitimacy, as well as to store results from the manual review for each incident submitted. The manual review can confirm or verify whether each incident in the subset is actually misidentified or not. If an incident is indeed misidentified, as verified based on the manual review, then the incident is marked, tagged, or categorized as being legitimate and allowed to proceed, exist, remain enabled, and/or remain activated. If the manual review indicates that the incident is not misidentified, then the incident is actually illegitimate and thus is marked as such and becomes disabled, deactivated, blocked, stopped, etc.

Figure 6:
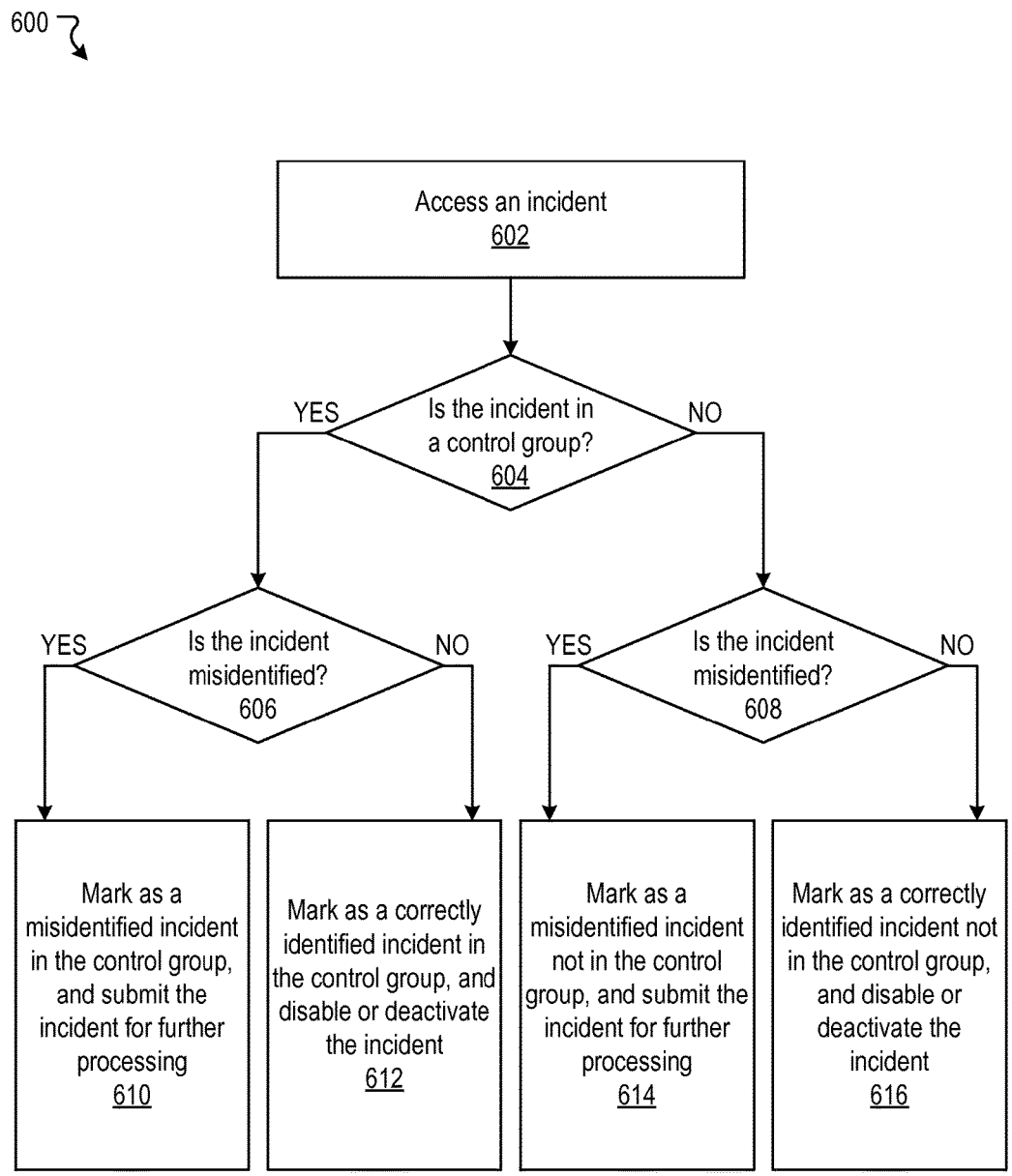
FIG. 6 illustrates an example flowchart associated with processing potentially misidentified illegitimate incidents, according to an embodiment of the present disclosure.

FIG. 6 illustrates an example flowchart 600 associated with processing potentially misidentified illegitimate incidents, according to an embodiment of the present disclosure. At block 602 of the example flowchart 600, an incident is accessed. The incident can correspond to an incident out of a set of incidents which have already been identified as being (allegedly) illegitimate. At block 604, it can be determined whether or not the incident is part of a control group. In some embodiments, the control group can be utilized in calculating, approximating, determining, or acquiring various types of data, such as statistical data. More details regarding the control group will be provided below.

If the incident is in or part of the control group, then at block 606, one or more rules can be utilized to determine whether or not the incident has been misidentified as being illegitimate. If the incident has been misidentified, then at block 610, the incident can be marked (or labeled, tagged, categorized, etc.) as a misidentified incident in the control group and the incident can be submitted for further processing. If the incident has not been misidentified, then at block 612, the incident can be marked as a correctly identified incident in the control group and the incident can be disabled or deactivated.

If the incident is not in the control group, then at block 608, the one or more rules can be utilized to determine whether or not the incident has been misidentified as being illegitimate. If the incident has been misidentified, then at block 614, the incident can be marked as a misidentified incident not in the control group and the incident can be submitted for further processing. If the incident has not been misidentified, then at block 616, the incident can be marked as a correctly identified incident not in the control group and the incident can be disabled or deactivated.

As described previously, the control group can be utilized in calculating, approximating, determining, or acquiring various types of data, such as statistical data. The various types of data can be used for observation, research, development, and/or reporting purposes. In one example, 10% of the set of incidents can be designated as being in the control group or placed in the control group. As such, in order to approximate the total number of incidents that have been misidentified (i.e., the total number of incidents associated with block 610 and block 614), the number of incidents associated with block 610 can be determined or summed up, and that number can be multiplied by 10 in order to approximate the total number of incidents that have been misidentified. Otherwise, it may be computationally intensive to count all of the incidents associated with block 614. Furthermore, it is understood that many variations are possible.

Figure 7:
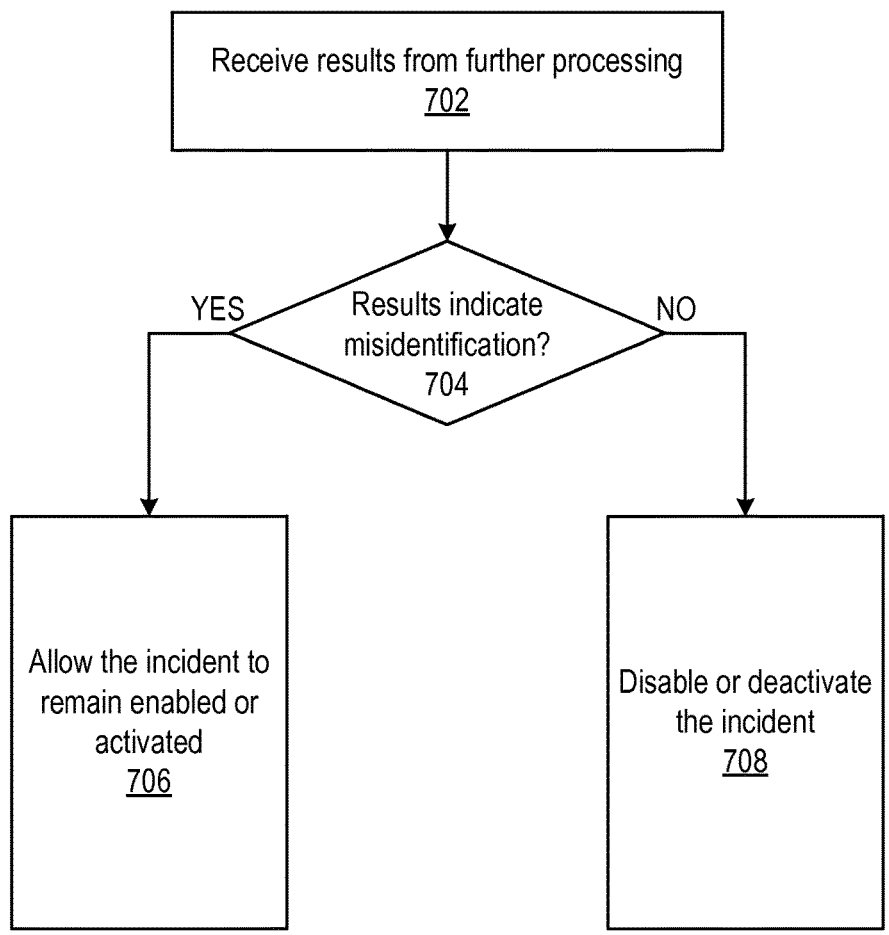
FIG. 7 illustrates an example flowchart associated with processing potentially misidentified illegitimate incidents, according to an embodiment of the present disclosure.

FIG. 7 illustrates an example flowchart 700 associated with processing potentially misidentified illegitimate incidents, according to an embodiment of the present disclosure. At block 702 of the example flowchart 700, results can be received for an incident submitted for further processing, which can include a manual review of the incident for legitimacy. At block 704, it can be determined whether or not the results indicate that the incident had indeed been misidentified as being illegitimate. If the results indicate that the incident had indeed been misidentified, then at block 706, the misidentified incident can be allowed to remain enabled or activated. If results do not indicate that the incident had been misidentified, then at block 708, the incident can be considered correctly identified and thus is disabled or deactivated. Many variations are possible.

Figure 8:
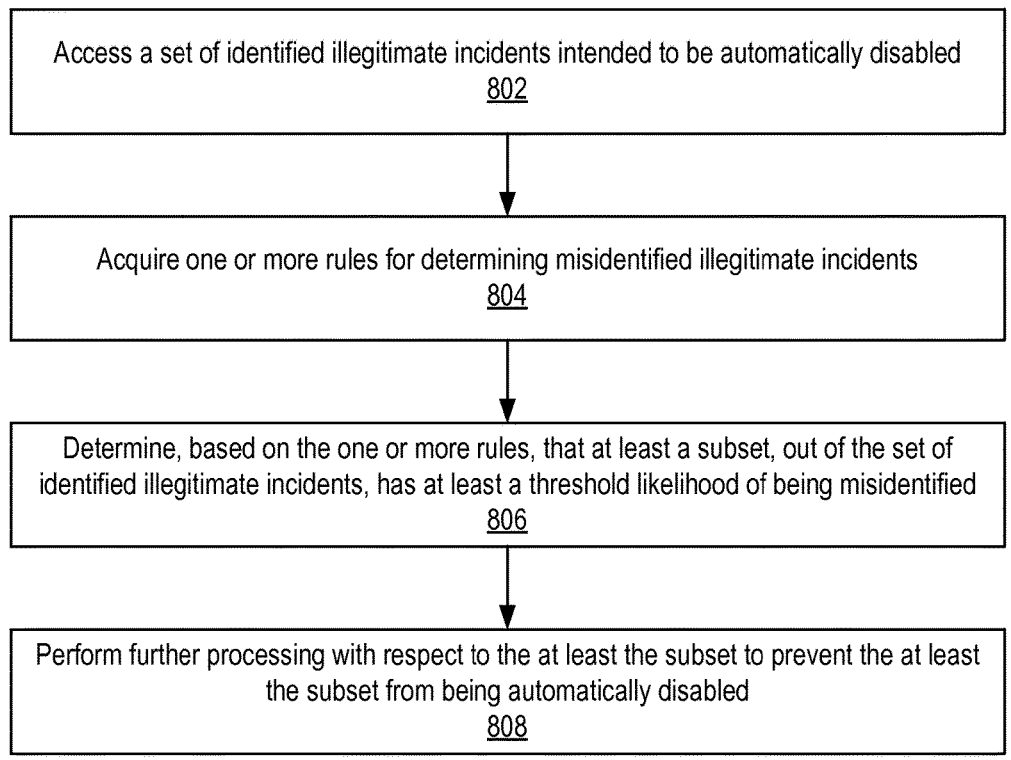
FIG. 8 illustrates an example method associated with processing potentially misidentified illegitimate incidents, according to an embodiment of the present disclosure.

FIG. 8 illustrates an example method 800 associated with processing potentially misidentified illegitimate incidents, according to an embodiment of the present disclosure. It should be appreciated that there can be additional, fewer, or alternative steps performed in similar or alternative orders, or in parallel, within the scope of the various embodiments unless otherwise stated.

At block 802, the example method 800 can access a set of identified illegitimate incidents intended to be automatically disabled. At block 804, the example method 800 can acquire one or more rules for determining misidentified illegitimate incidents. At block 806, the example method 800 can determine, based on the one or more rules, that at least a subset, out of the set of identified illegitimate incidents, has at least a threshold likelihood of being misidentified. At block 808, the example method 800 can perform further processing with respect to at least the subset to prevent at least the subset from being automatically disabled.

In some embodiments, various embodiments of the present disclosure can take place in the background. For example, a misidentification of a legitimate account or activity as being illegitimate can be corrected in the background by the disclosed technology, such that a user associated with the legitimate account or activity will not be aware of the misidentification and/or the correction.

Again, it is contemplated that there can be many other uses, applications, and/or variations associated with the various embodiments of the present disclosure. For example, various embodiments of the present disclosure can learn, improve, and/or be refined over time.

Social Networking System—Example Implementation

Figure 9:
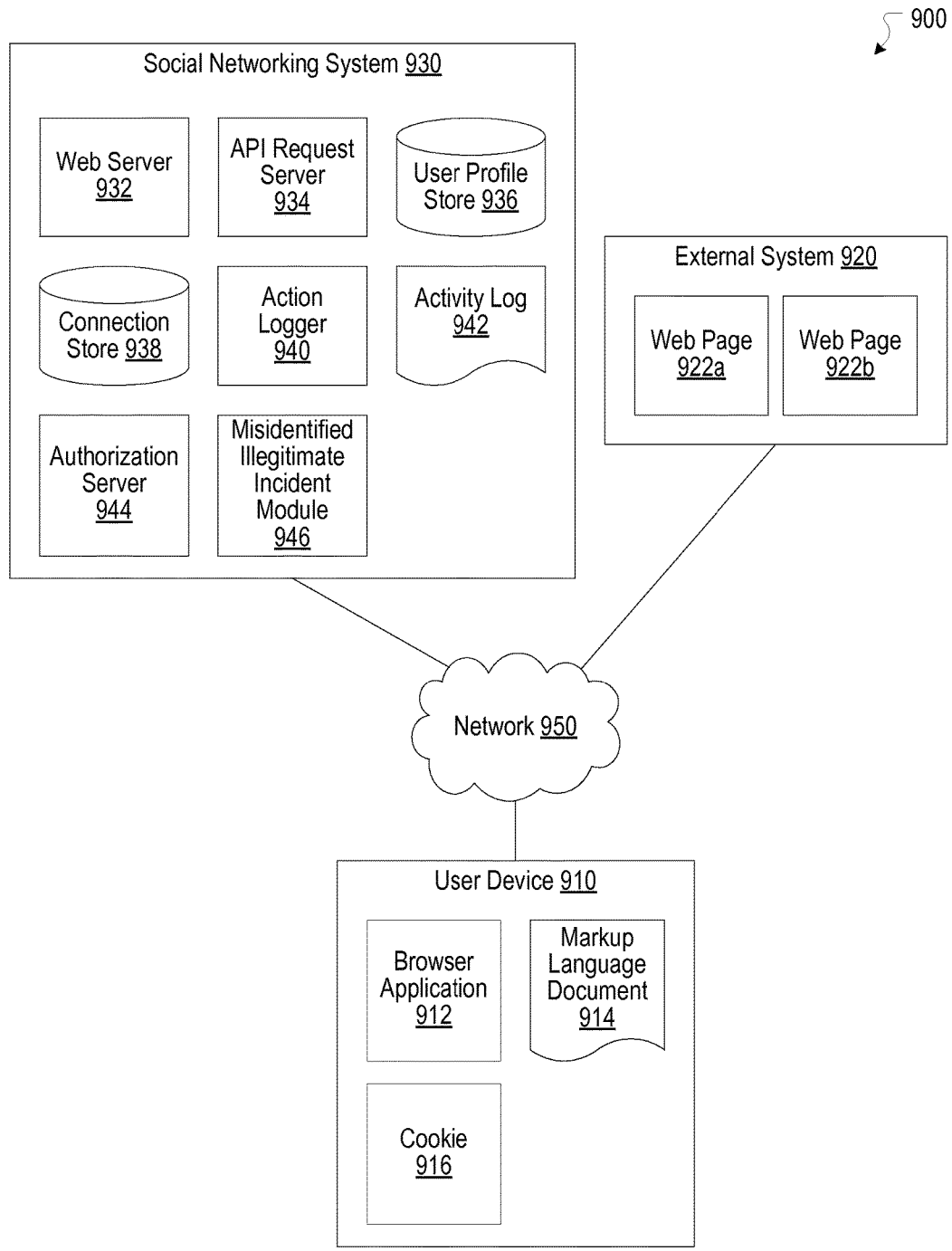
FIG. 9 illustrates a network diagram of an example system that can be utilized in various scenarios, according to an embodiment of the present disclosure.

FIG. 9 illustrates a network diagram of an example system 900 that can be utilized in various scenarios, in accordance with an embodiment of the present disclosure. The system 900 includes one or more user devices 910, one or more external systems 920, a social networking system (or service) 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922*a* within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

In some embodiments, the social networking system 930 can include a misidentified illegitimate incident module 946. The misidentified illegitimate incident module 946 can, for example, be implemented as the misidentified illegitimate incident module 102 of FIG. 1. The misidentified illegitimate incident module 946 can be configured to facilitate accessing a set of identified illegitimate incidents intended to be automatically disabled. The misidentified illegitimate incident module 946 can also be configured to facilitate acquiring one or more rules for determining misidentified illegitimate incidents. Further, the misidentified illegitimate incident module 946 can be configured to facilitate determining, based on the one or more rules, that at least a subset, out of the set of identified illegitimate incidents, has at least a threshold likelihood of being misidentified. Moreover, the misidentified illegitimate incident module 946 can be configured to facilitate performing further processing with respect to at least the subset to prevent at least the subset from being automatically disabled. Other features of the misidentified illegitimate incident module 946 are discussed herein in connection with the misidentified illegitimate incident module 102 of FIG. 1.

Hardware Implementation

Figure 10:
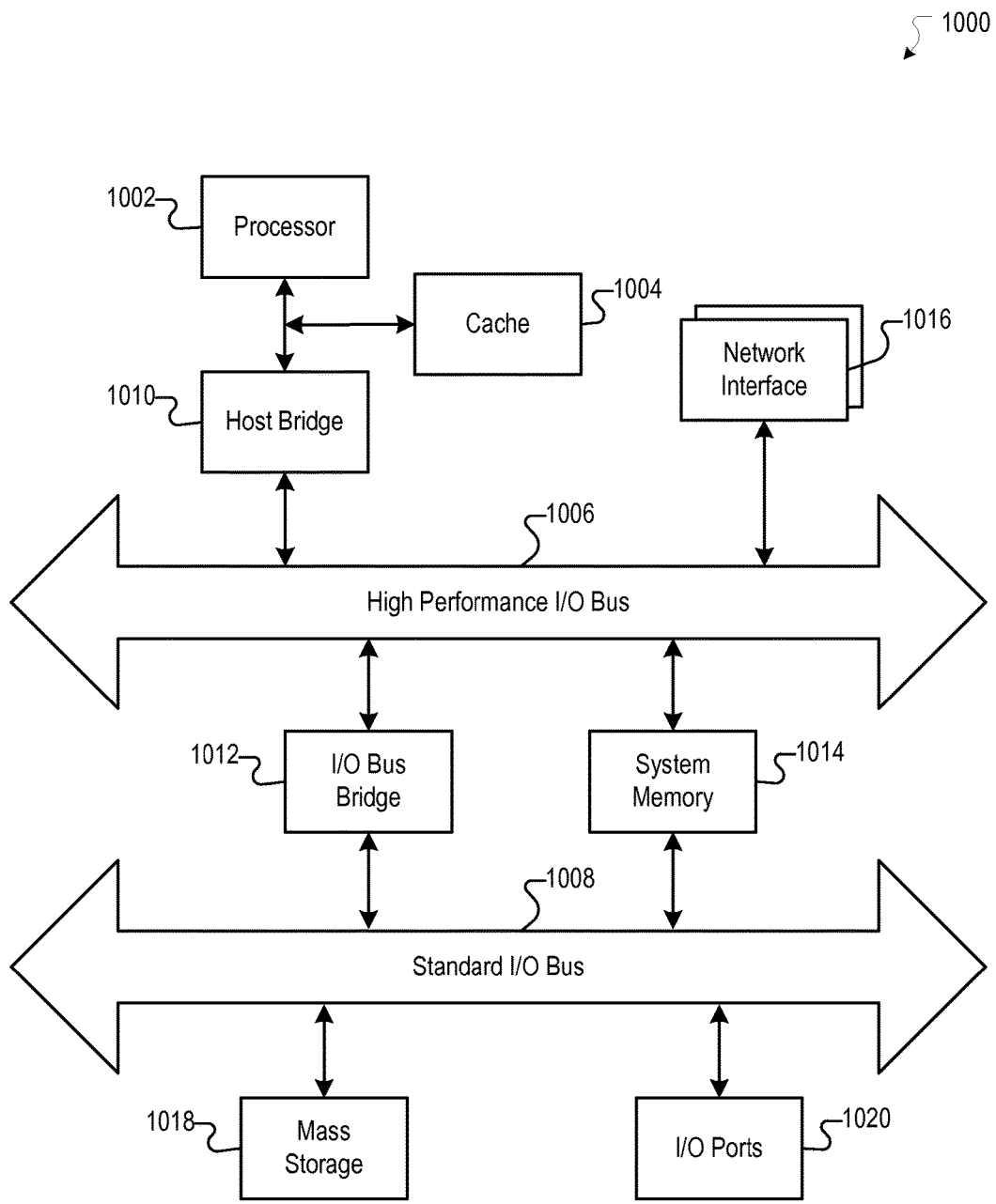
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 930, the user device 910, and the external system 1020, or a component thereof. In an embodiment of the invention, the computer system 1000 may be one server among many that constitutes all or part of the social networking system 930.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Moreover, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   accessing, by a computing system, a set of identified illegitimate incidents intended to be automatically disabled, wherein the set of identified illegitimate incidents includes an activity or an account associated with a social networking system that is identified as being illegitimate;
   acquiring, by the computing system, one or more rules for determining misidentified illegitimate incidents, wherein the one or more rules includes a social connection rule that specifies that an identified illegitimate incident, in the set of identified illegitimate incidents, has at least a threshold likelihood of being misidentified when the identified illegitimate incident is associated with a ratio of social connection request acceptances to social connection requests that indicates social connection request acceptances exceed social connection request non-acceptances;
   determining, by the computing system, based on the one or more rules, that at least a subset, out of the set of identified illegitimate incidents, has at least the threshold likelihood of being misidentified;
   performing, by the computing system, further processing with respect to at least the subset to prevent at least the subset from being automatically disabled; and
   determining, by the computing system, a total number of misidentified incidents based at least in part on a number of misidentified incidents in the subset.

2. The computer-implemented method of claim 1, wherein the performing of the further processing with respect to at least the subset further comprises:
   placing at least the subset into a queue for manual review of legitimacy.

3. The computer-implemented method of claim 1, wherein the one or more rules further includes a source rule, and wherein the source rule specifies that the identified illegitimate incident, in the set of identified illegitimate incidents, has at least the threshold likelihood of being misidentified when the identified illegitimate incident is associated with a source absent from being previously determined to be illegitimate.

4. The computer-implemented method of claim 1, wherein the one or more rules further includes a domain rule, and wherein the domain rule specifies that the identified illegitimate incident, in the set of identified illegitimate incidents, has less than at least the threshold likelihood of being misidentified when the identified illegitimate incident is associated with a prominent domain that is publicly available.

5. The computer-implemented method of claim 1, wherein the social connection rule further specifies that the identified illegitimate incident, in the set of identified illegitimate incidents, has at least the threshold likelihood of being misidentified when the identified illegitimate incident is associated with a quantity of social connections that at least meets a social connection quantity threshold.

6. The computer-implemented method of claim 1, wherein the one or more rules further includes a messaging rule, and wherein the messaging rule specifies that the identified illegitimate incident, in the set of identified illegitimate incidents, has at least the threshold likelihood of being misidentified when the identified illegitimate incident is associated with an amount of communicating messages that at least meets a messaging amount threshold.

7. The computer-implemented method of claim 1, wherein the one or more rules further includes a bid type rule, and wherein the bid type rule specifies that the identified illegitimate incident, in the set of identified illegitimate incidents, has at least the threshold likelihood of being misidentified when the identified illegitimate incident is associated with a Cost Per Mille (CPM) bid type.

8. The computer-implemented method of claim 1, wherein the one or more rules further includes a bid type rule, and wherein the bid type rule specifies that the identified illegitimate incident, in the set of identified illegitimate incidents, has less than at least the threshold likelihood of being misidentified when the identified illegitimate incident is associated with a Cost Per Click (CPC) bid type.

9. The computer-implemented method of claim 1, wherein the one or more rules further includes a landing page rule, and wherein the landing page rule specifies that the identified illegitimate incident, in the set of identified illegitimate incidents, has less than at least the threshold likelihood of being misidentified when the identified illegitimate incident is associated with an illegitimate landing page.

10. The computer-implemented method of claim 1, wherein the one or more rules are generated based on analyzing a verified set of misidentified illegitimate incidents to determine one or more common characteristics associated with the verified set of misidentified illegitimate incidents.

11. The computer-implemented method of claim 1, wherein the one or more rules are static, wherein the one or more rules are utilized by a conditional response framework, and wherein the conditional response framework is implemented with a risk system.

12. The computer-implemented method of claim 1, wherein the set of identified illegitimate incidents includes at least one of an activity identified as having a threshold likelihood of being an illegitimate activity or an account identified as having a threshold likelihood of being an illegitimate account.

13. A system comprising:
at least one processor; and
a memory storing instructions that, when executed by the at least one processor, cause the system to perform:
  accessing a set of identified illegitimate incidents intended to be automatically disabled, wherein the set of identified illegitimate incidents includes an activity or an account associated with a social networking system that is identified as being illegitimate;
  acquiring one or more rules for determining misidentified illegitimate incidents, wherein the one or more rules includes a social connection rule that specifies that an identified illegitimate incident, in the set of identified illegitimate incidents, has at least a threshold likelihood of being misidentified when the identified illegitimate incident is associated with a ratio of social connection request acceptances to social connection requests that indicates social connection request acceptances exceed social connection request non-acceptances;
  determining, based on the one or more rules, that at least a subset, out of the set of identified illegitimate incidents, has at least the threshold likelihood of being misidentified;
  performing further processing with respect to at least the subset to prevent at least the subset from being automatically disabled; and
  determining, by the computing system, a total number of misidentified incidents based at least in part on a number of misidentified incidents in the subset.

14. The system of claim 13, wherein the instructions cause the system to further perform:
  placing at least the subset into a queue for manual review of legitimacy.

15. The system of claim 13, wherein the one or more rules are generated based on analyzing a verified set of misidentified illegitimate incidents to determine one or more common characteristics associated with the verified set of misidentified illegitimate incidents.

16. The system of claim 13, wherein the one or more rules are static, wherein the one or more rules are utilized by a conditional response framework, and wherein the conditional response framework is implemented with a risk system.

17. A non-transitory computer-readable storage medium including instructions that, when executed by at least one processor of a computing system, cause the computing system to perform:
  accessing a set of identified illegitimate incidents intended to be automatically disabled, wherein the set of identified illegitimate incidents includes an activity or an account associated with a social networking system that is identified as being illegitimate;
  acquiring one or more rules for determining misidentified illegitimate incidents, wherein the one or more rules includes a social connection rule that specifies that an identified illegitimate incident, in the set of identified illegitimate incidents, has at least a threshold likelihood of being misidentified when the identified illegitimate incident is associated with a ratio of social connection request acceptances to social connection requests that indicates social connection request acceptances exceed social connection request non-acceptances;
  determining, based on the one or more rules, that at least a subset, out of the set of identified illegitimate incidents, has at least the threshold likelihood of being misidentified;
  performing further processing with respect to at least the subset to prevent at least the subset from being automatically disabled; and
  determining, by the computing system, a total number of misidentified incidents based at least in part on a number of misidentified incidents in the subset.

18. The non-transitory computer-readable storage medium of claim 17, wherein the instructions cause the computing system to further perform:
  placing at least the subset into a queue for manual review of legitimacy.

19. The non-transitory computer-readable storage medium of claim 17, wherein the one or more rules are generated based on analyzing a verified set of misidentified illegitimate incidents to determine one or more common characteristics associated with the verified set of misidentified illegitimate incidents.

20. The non-transitory computer-readable storage medium of claim 17, wherein the one or more rules are static, wherein the one or more rules are utilized by a conditional response framework, and wherein the conditional response framework is implemented with a risk system.

* * * * *